United States Patent
Frank et al.

(10) Patent No.: US 8,221,283 B2
(45) Date of Patent: Jul. 17, 2012

(54) DRIVE TRAIN CONNECTION FOR VEHICLES

(75) Inventors: Holger Frank, Friedrichshafen (DE); Jonathan Lipp, Friedrichshafen (DE); Michael Willmann, Bermatingen (DE)

(73) Assignee: IFA-Technologies GmbH, Haldensleben (DE)

( * ) Notice: Subject to any disclaimer, the term of this patent is extended or adjusted under 35 U.S.C. 154(b) by 324 days.

(21) Appl. No.: 12/661,144

(22) Filed: Mar. 11, 2010

(65) Prior Publication Data

US 2010/0239360 A1    Sep. 23, 2010

(30) Foreign Application Priority Data

Mar. 13, 2009   (DE) .......................... 10 2009 012 789

(51) Int. Cl.
*F16H 57/08* (2006.01)
*F16D 1/076* (2006.01)
*F16D 3/20* (2006.01)

(52) U.S. Cl. ....................................... 475/331; 475/349

(58) Field of Classification Search ................... 475/331, 475/349; 411/432
See application file for complete search history.

(56) References Cited

U.S. PATENT DOCUMENTS

| | | | | |
|---|---|---|---|---|
| 2,704,426 A * | 3/1955 | Macaulay | ...................... | 451/342 |
| 4,955,744 A * | 9/1990 | Barth et al. | .................... | 403/259 |
| 6,682,284 B2 * | 1/2004 | Chen | .............................. | 411/432 |
| 6,689,000 B1 * | 2/2004 | Kapaan et al. | .................. | 474/20 |
| 7,832,319 B2 * | 11/2010 | Phillips et al. | .................. | 83/481 |
| 2011/0036207 A1 * | 2/2011 | Yang | ................................ | 81/57 |

FOREIGN PATENT DOCUMENTS

| | | |
|---|---|---|
| DE | 10 2004 048 079 | 4/2006 |
| FR | 2 662 757 | 12/1991 |

* cited by examiner

*Primary Examiner* — Sherry Estremsky
(74) *Attorney, Agent, or Firm* — Collard & Roe, P.C.

(57) ABSTRACT

A drive train connection has a shaft, a joint, particularly a constant velocity joint, and a coupling device. The coupling device is a planetary gear mechanism having a hollow wheel, at least one planet wheel and a sun wheel. The shaft and the sun wheel have corresponding locking means oriented in the axial direction. The sun wheel, together with the joint, can be screwed onto the shaft or unscrewed from the shaft by turning the hollow wheel.

8 Claims, 3 Drawing Sheets

DRIVE TRAIN CONNECTION FOR VEHICLES

CROSS REFERENCE TO RELATED APPLICATIONS

Applicants claim priority under 35 U.S.C. 119 of German Application No. 10 2009 012 789.5 filed Mar. 13, 2009.

BACKGROUND OF THE INVENTION

1. Field of the Invention

The invention relates to a drive train connection, particularly for vehicles.

2. The Prior Art

A drive train connection for vehicles is described in German Patent Application No. DE 10 2004 048 079 B4, in which an inner joint part of a constant velocity rotary joint is connected with a screw connection sleeve by way of a locking ring. The screw connection sleeve can be screwed onto a counter-thread of a shaft journal of an axle drive by means of a wrench, with a screw thread. Such a drive train connection requires a filigreed connection, which is difficult to monitor, between the inner joint part and the screw connection sleeve.

Another drive train connection is described in FR 2 662 757, in which a tightening nut can be screwed onto a drive shaft, for axial securing. The tightening nut is disposed on a joint part on the transmission side, and can be turned by a tool that can be inserted through the joint part. Furthermore, the tightening nut can be locked in place by a pin. Such a drive train connection requires a tightening nut having a bevel wheel gearing, which is complicated in terms of production technology, and furthermore requires a special tool for producing and loosening the connection.

SUMMARY OF THE INVENTION

It is therefore an object of the invention to propose a drive train connection that can be produced in a cost-advantageous manner, with simple components, and, in particular, does not require any special tool for assembly and disassembly.

This task is accomplished according to the invention by a drive train connection that has a coupling means that comprises a planetary gear mechanism. The planetary gear mechanism comprises a hollow wheel, at least one planet wheel, and a sun wheel. The shaft and the sun wheel have corresponding locking means oriented in the axial direction, and the sun wheel, together with the joint, can be screwed onto the shaft or unscrewed from the shaft by rotating the hollow wheel. A coupling means configured in this manner can be implemented with components that can be produced in a simple manner, and can be activated without a tool. The heart of the invention is therefore a coupling means that is easily accessible for activation both during assembly and during disassembly, despite great differences between the diameter of the shaft and the diameter of the joint, and can furthermore be easily activated by hand and without a tool.

The invention provides for configuring the torque transfer means by a gearing, particularly by at least one corresponding groove/wedge connection, and, in particular, by corresponding spline shaft profiles on the shaft and on the joint part that are connected with the shaft. Such torque transfer means allow simple coupling and uncoupling of shaft and joint part by pushing the components together and pulling them apart.

Furthermore, the invention provides for configuring the locking means by connection means that engage into one another with shape fit, which are particularly implemented in the form of a threaded connection or a bayonet connection. Such connection means can be produced in a simple manner, in terms of production technology, and are suitable for use even in difficult ambient conditions.

The invention particularly provides for configuring the threaded connection via an inside thread and an outside thread. The inside thread is particularly configured on the sun wheel and the outside thread is particularly configured on the shaft, and preferably on a continuation of the shaft. Such thread types can be produced in a simple manner, in terms of production technology, on both components.

Furthermore, the invention provides for configuring an accommodation chamber for the sun wheel in the joint part, which chamber can be closed off by a lid. In this way, the sun wheel can be fixed in place in the joint part, in the axial direction, with simple means.

Finally, the invention provides for connecting a section of the joint part close to the shaft and a section of the joint part far away from the shaft, to which the planetary gear mechanism belongs, by means of at least one, preferably three torque-transferring crosspieces. In this way, high torques can be transferred from the section close to the shaft to the section far away from the shaft, despite the planetary gear mechanism that is built into the joint part.

The terms screw on and unscrew, in the sense of the invention, with regard to the connection of sun wheel and shaft, describe both connecting the components using threads, and connecting the components using a closure structured according to the principle of a bayonet connection.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
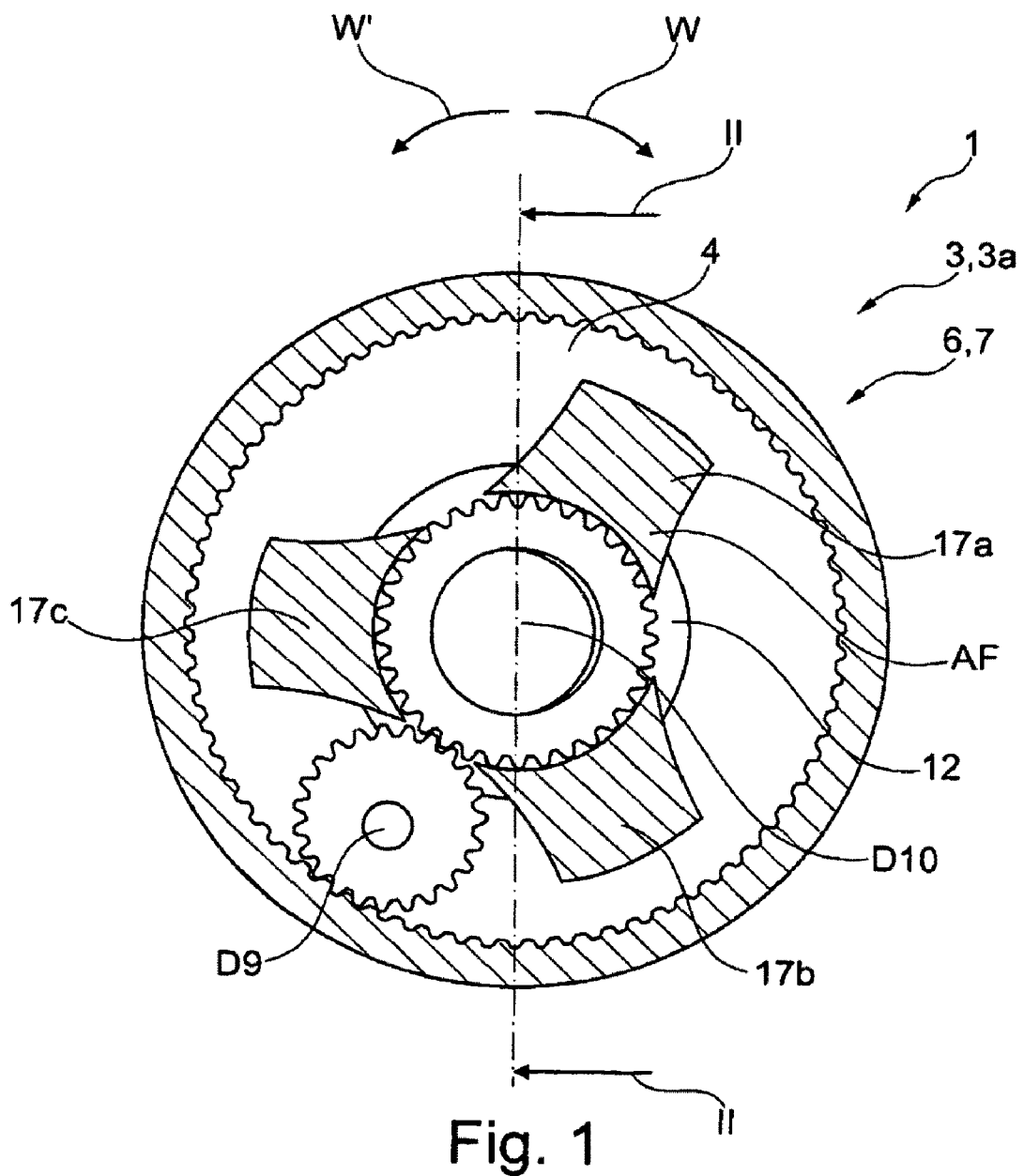
FIG. 1 shows a cross-section through an embodiment variant of a joint of a drive train connection according to one embodiment of the invention, shown partly schematically.

Referring now in detail to the drawings, FIG. 1 shows a cross-section through an embodiment of a drive train connection 1, shown partly schematically. The section line for this section runs in accordance with the section line I-I shown in FIG. 2. The drive train connection 1 according to the invention essentially comprises a shaft 2 shown in FIGS. 2 and 3 and a joint 3, whereby shaft 2 is preferably configured as a spline shaft 2a, and joint 3 is preferably configured as a constant velocity joint 3a. In this connection, all three figures are to be understood as schematic drawings, whereby in FIG. 2, in particular, the cut surfaces are not indicated with hatched lines, in order to maintain a clear illustration. Joint 3 comprises a first joint part 4 and a second joint part 5. First joint part 4 is configured as an outer joint part 4a, and second joint part 5 is configured as an inner joint part 5a. Drive train connection 1, i.e., joint 3, furthermore comprises a coupling means 6. Coupling means 6 is structured as a planetary gear mechanism 7, which essentially comprises a hollow wheel 8, a planet wheel 9, and a sun wheel 10. Sun wheel 10 is fixed in place in first joint part 4, in axial direction x. For this purpose, first joint part 4 has an accommodation chamber 11 that can be closed off by a lid 12. First joint part 4 is rotatably connected to second joint part 5 by way of torque-transferring balls 13 that are held in a ball cage 14. Second joint part 5, which is configured as an inner joint part 5a, has a passage bore 15 with a shaft gearing 16, into which another spline shaft, not shown, can be inserted. First joint part 4 has a section I close to the shaft to the left of planetary gear mechanism 7, and a section II far away from the shaft to the right of planetary gear mechanism 7. These two sections I, II are connected with one another by three crosspieces 17a, 17b and 17c, through planetary gear 7. The crosspieces 17a, 17b, 17c together form an outside guide AF for the sun wheel, by means of which this wheel is held centered relative to an axis of rotation D10. In the section I close to the shaft, first joint part 4 has a bore 18 that runs in the axial direction x and possesses a shaft gearing 19. Shaft gearing 19 of bore 18 of the first joint part 4 and shaft gearing 2b of shaft 2 form torque transfer means DM. Bore 18 opens into accommodation chamber 11 of planetary gear mechanism 7 that has already been mentioned, in which sun wheel 10 is disposed. Sun wheel 10 can rotate about a longitudinal axis L that runs in the axial direction x, relative to first joint part 4. A rotation of sun wheel 10 in a direction of rotation w or in an opposite direction of rotation w' can be produced by hollow wheel 8, which acts on sun wheel 10 by way of planet wheel 9. In this connection, planet wheel 9 is held on the section I of the first joint part 4 that is close to the shaft, by a planet carrier 21 configured as a pin 20, so as to rotate about an axis of rotation D9. By means of the sun wheel 10 that can be driven by planetary gear mechanism 7, it is now possible to fix the schematically represented shaft 2 in place on first joint part 3 of joint 4, in the axial direction. For this purpose, shaft 2 has a continuation 22 having an outside thread 23. This outside thread 23 is structured to correspond in its dimensions to an inside thread 24 structured in sun wheel 10. Outside thread 23 of shaft 2 and inside thread 24 of sun wheel 10 form a threaded connection 25 with one another, and serve as locking means AR. According to another embodiment, not shown, the locking means can be formed by connection means that are connected and released in the manner of a bayonet closure, by inserting them into one another and turning them relative to one another.

Figure 2:
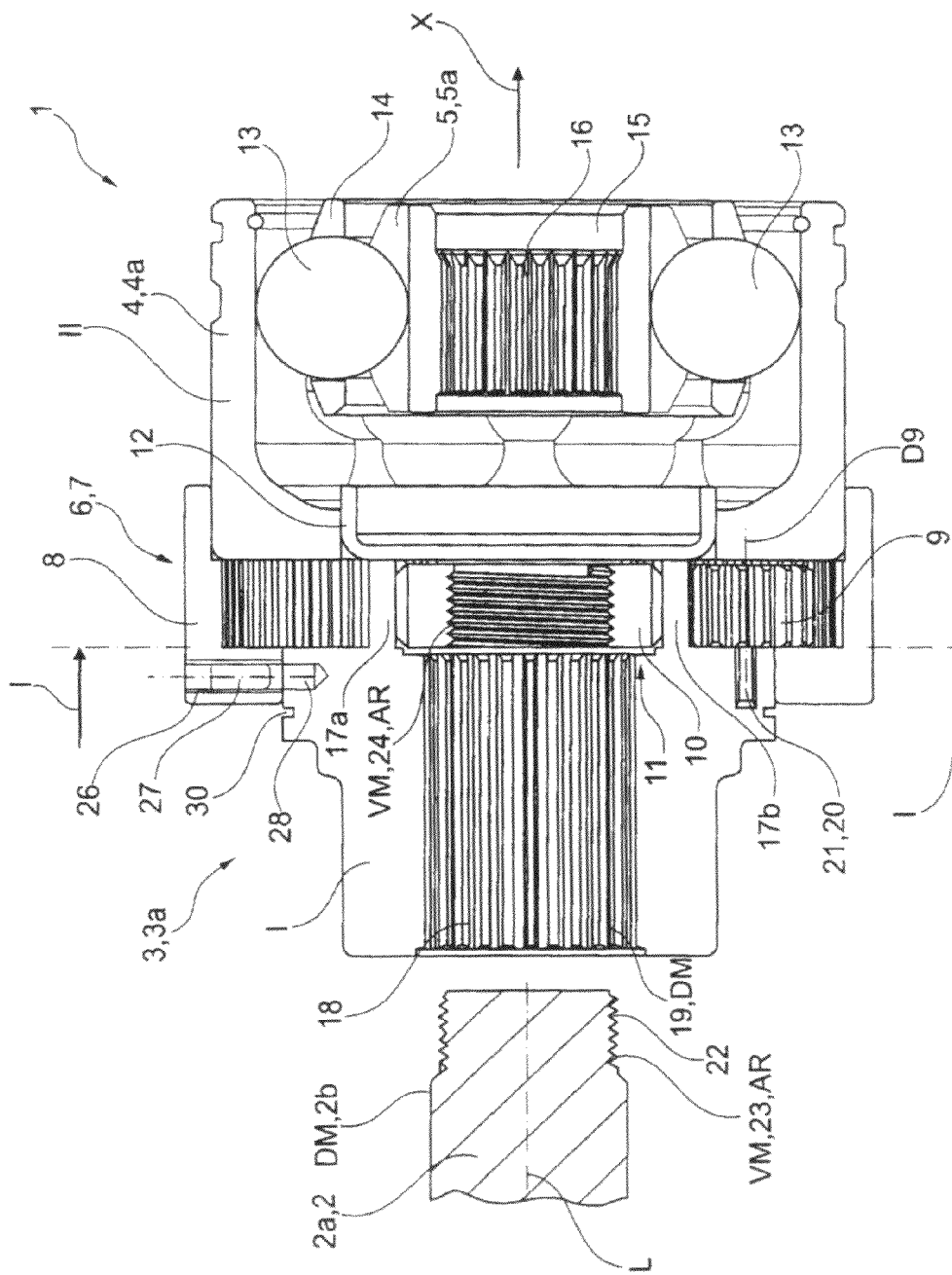
FIG. 2 shows a longitudinal section through the joint shown in FIG. 1, corresponding to the section line II-II shown in FIG. 1, with the shaft disassembled.
Figure 3:
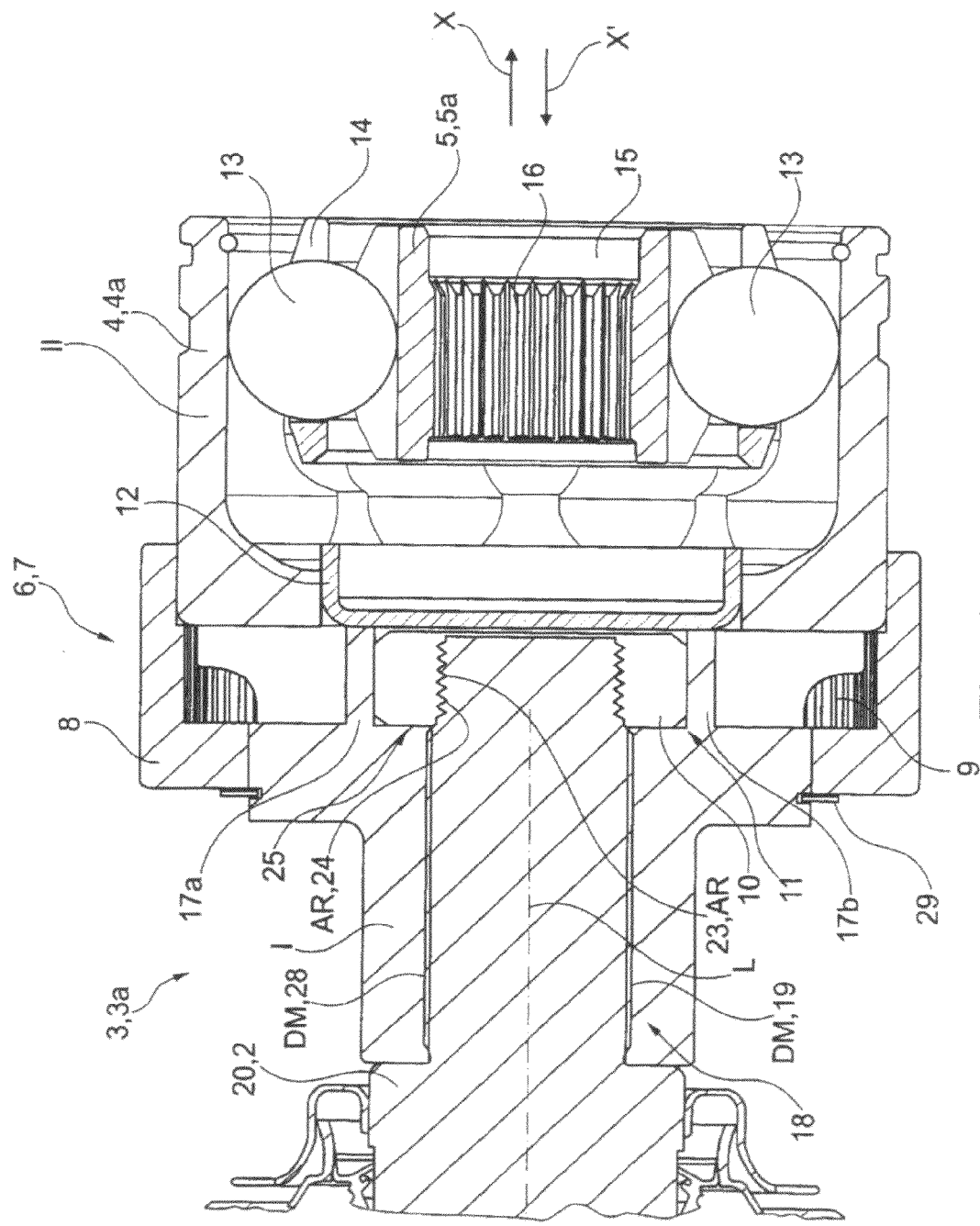
FIG. 3 shows another longitudinal section through the joint shown in FIG. 1, corresponding to the section line II-II shown in FIG. 1, with the shaft assembled.

For assembly, i.e. for axial fixation of shaft 2 on first joint part 4, shaft 2 is pushed into bore 18 of section I of first joint part 4 that is close to the shaft, from the position shown in FIG. 2, in the arrow direction x, until continuation 22 of shaft 2 meets inside thread 24 of sun wheel 10. Subsequently, hollow wheel 8 of planetary gear mechanism 7 is rotated about longitudinal axis L in such a manner that the sun wheel is screwed onto continuation 22 of shaft 2, and in this connection, shaft 2 is pulled further into first joint part 4, in the arrow direction x. As soon as shaft 2 is standing in a planned axial position shown in FIG. 3, hollow wheel 8 and/or planet wheel 9 and/or sun wheel 10 is/are fixed in place on first joint part 4, so as to prevent rotation. In the exemplary embodiment, in FIG. 2, fixation of hollow wheel 8 on section I of the first joint part 4 close to the shaft is shown schematically. For this purpose, the hollow wheel has a threaded bore 26 in which a headless screw 27 is disposed, half of which can be screwed into a bore 28 formed in first joint part 4, for fixation.

In addition, securing of hollow wheel 8 to prevent axial movement in the x' direction takes place by a locking ring 29 that engages into a circumferential groove 30 that is formed on outer joint part 4a. Locking ring 29 is only shown in FIG. 3. Shaft 2 is particularly configured as a transmission output shaft. The other shaft, not shown, which can be coupled with inner joint part 5a, is particularly configured as a universal shaft.

The invention is not restricted to exemplary embodiments that are shown or described. Instead, it comprises further developments of the invention, within the scope of the claims.

REFERENCE SYMBOL LIST 1 drive train connection
2 shaft
2a spline shaft
2b shaft gearing
3 joint
3a constant velocity joint
4 first joint part of 3
4a outer joint part
5 second joint part of 3
5a inner joint part
6 coupling means
7 planetary gear mechanism
8 hollow wheel
9 planet wheel
10 sun wheel
11 accommodation chamber for 10 in 4
12 lid for 11
13 torque-transferring ball
14 ball cage
15 passage bore in 5
16 shaft gearing of 15
17a crosspiece between I and II
17b crosspiece between I and II
17c crosspiece between I and II
18 bore in I
19 shaft gearing of 18
20 pin of 21
21 planet carrier
22 continuation on 2
23 outside thread of 2 on 22
24 inside thread in 10
25 threaded connection composed of 23, 24
26 threaded bore in 8
27 headless screw
28 radial bore in I
29 locking ring for 8
30 circumferential groove on 4a for 29
I section of 4 close to the shaft
II section of 4 far away from the shaft
AF outside guide composed of 17a, 17b, 17c
AR locking means
D9 axis of rotation of 9
D10 axis of rotation of 10
DM torque transfer means
L longitudinal axis
VM connection means
w, w' direction of rotation about L
x axial direction

What is claimed is:
1. A drive train connection, comprising:
a shaft;
a joint having a first joint part and a second joint part; and a coupling means fixed in place on one of the joint parts in an axial direction and comprising a planetary gear mechanism having a hollow wheel, at least one planet wheel and a sun wheel, wherein the shaft is connected with said one joint part by way of torque transfer means so as to rotate with said one joint part, wherein the shaft and the sun wheel have corresponding locking means oriented in the axial direction, and wherein the sun wheel, together with the joint, is adapted to be screwed onto the shaft or unscrewed from the shaft by turning the hollow wheel.

2. The drive train connection according to claim 1, wherein the torque transfer means are formed by a gearing.

3. The drive train connection according to claim 1, wherein the torque transfer means are formed by at least one corresponding groove/wedge connection.

4. The drive train connection according to claim 1, wherein the torque transfer means are formed by corresponding spline shaft profiles on the shaft and on said one joint part that is connected with the shaft.

5. The drive train connection according to claim 1, wherein the locking means comprise connection means that engage into one another with a shape fit, said connection means being formed as a threaded connection.

6. The drive train connection according to claim 5, wherein the connection means comprises an inside thread and an outside thread, wherein the inside thread is configured on the sun wheel and the outside thread is configured on the shaft or on a continuation of the shaft.

7. The drive train connection according to claim 1, wherein the joint part has an accommodation chamber for the sun wheel, and a lid for closing off the accommodation chamber.

8. The drive train connection according to claim 1, wherein a first section of said one joint part close to the shaft and a second section of said one joint part far away from the shaft, said second section comprising the planetary gear mechanism, are connected by at least one torque-transferring crosspiece.

* * * * *